United States Patent
Vaidyanathan et al.

(10) Patent No.: US 7,660,060 B2
(45) Date of Patent: Feb. 9, 2010

(54) DYNAMICALLY CONTROLLING A TEMPERATURE PROFILE IN A DISK DRIVE FOR A TEMPERATURE-DEPENDENT RELIABILITY STUDY

(75) Inventors: Kalyanaraman Vaidyanathan, San Diego, CA (US); Kenny C. Gross, San Diego, CA (US); Roger E. Blythe, San Diego, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 563 days.

(21) Appl. No.: 11/471,206

(22) Filed: Jun. 20, 2006

(65) Prior Publication Data

US 2007/0291390 A1    Dec. 20, 2007

(51) Int. Cl.
*G11B 27/36* (2006.01)
*G11B 15/18* (2006.01)
*G11B 17/00* (2006.01)
*G11B 19/02* (2006.01)
*G11B 21/02* (2006.01)

(52) U.S. Cl. .............................. 360/31; 360/69; 360/75
(58) Field of Classification Search ....................... None
See application file for complete search history.

(56) References Cited

U.S. PATENT DOCUMENTS

2003/0202274 A1* 10/2003 Onda et al. .................. 360/69

\* cited by examiner

*Primary Examiner*—Daniell L Negrón
(74) *Attorney, Agent, or Firm*—Park, Vaughan & Fleming LLP

(57) ABSTRACT

One embodiment of the present invention provides a system that dynamically controls a temperature profile within a disk drive by generating disk drive activity. During operation, the system first receives a desired temperature profile. Next, the system generates a load profile based on the desired temperature profile, wherein the load profile specifies read/write operations on the disk drive. The system then applies the load profile to the disk drive to generate disk drive activity, wherein the disk activity causes the temperature in the disk drive to track the desired temperature profile.

19 Claims, 3 Drawing Sheets

DYNAMICALLY CONTROLLING A TEMPERATURE PROFILE IN A DISK DRIVE FOR A TEMPERATURE-DEPENDENT RELIABILITY STUDY

BACKGROUND

1. Field of the Invention

The present invention relates to techniques for performing reliability tests on components in computer systems. More specifically, the present invention relates to a method and an apparatus that dynamically controls a temperature profile within a disk drive to facilitate a temperature-dependent reliability study on the disk drive.

2. Related Art

Computer system manufacturers routinely evaluate the reliability of individual computer system components to ensure that the computer systems manufactured from the components meet or exceed reliability requirements of their customers. Typically, component reliabilities are determined through "reliability-evaluation studies." These reliability-evaluation studies can include "accelerated-life studies," which accelerate the failure mechanisms of a component, or "repair-center reliability evaluations" in which a vendor tests components returned from the field. These types of tests typically involve using environmental stress-test chambers to hold and/or cycle one or more stress variables (e.g. temperature, humidity, radiation, etc.) at levels that are believed to accelerate subtle failure mechanisms within a component. The components under test are then placed inside the stress-test chamber and subjected to these stress conditions.

One of the key components in a computer system is a disk drive, which stores large amount of data on a non-volatile recording medium. However, disk drives are complex electromechanical devices which are subject to failures caused by triggering events related to a variety of environmental parameters. These environmental parameters can include temperature, shock/vibration, humidity, cooling air flow rate, etc. A disk drive failure can cause silent data corruption, permanent data loss and possibly an unrecoverable computer system crash. Consequently, reliability studies are frequently performed on the disk drives to understand their failure mechanisms and characteristics.

In particular, a significant number of disk drive failures are temperature related. For example, the reliability of both disk drive electronics (such as electron migration in a flash memory chip) and disk drive mechanics (such as the spindle motor and actuator bearings) degrades as temperature increases. In addition, high temperature environments in disk drives can cause thermal instability in the data stored in the recording medium, which over long periods of time can lead to permanent data erasing. Moreover, another serious failure mode: lubricant dry-out on the disk drive surface, is exacerbated by a high temperature.

To conduct accelerated-life studies on disk's drive thermal reliability, the disk drives are commonly loaded into thermal chambers where temperature is cycled in an effort to accelerate mechanisms that can lead to drive failure. This type of study on the disk drives requires the disk drives to be shipped to a facility housing such programmable thermal chamber. At the facility, a population of drives are placed in the thermal chambers and their temperature is cycled for fixed time intervals (e.g. 100 Hrs, 500 Hrs). The drives are then removed from the test chambers and installed into a storage array where their functionality is tested.

Unfortunately, the thermal chamber study has several drawbacks. Firstly, it requires the drives to be uninstalled and removed from the computer systems and shipped to the test facility, which involves additional shipping time and expense. Secondly, during the reliability-evaluation, it is usually not possible to apply pass/fail tests for the disk drives while they are inside the thermal chambers. Consequently, at the predetermined time intervals, the disk drives are removed from the thermal chambers and are evaluated "ex-situ." Note that it is difficult to cycle temperatures for the drives while collecting real-time I/O performance information in an ex-situ reliability test. Furthermore, the thermal chamber study can only yield failure drive counts, without identifying the exact times of the onset of degradation in the drives. Note that it is desirable to obtain the exact times of drive failures to facilitate accurate long term reliability projections.

Hence, what is needed is a method and apparatus for performing in-situ temperature cycling for accelerated-life studies of disk drivers without the above-described problems.

SUMMARY

One embodiment of the present invention provides a system that dynamically controls a temperature profile within a disk drive by generating disk drive activity. During operation, the system first receives a desired temperature profile. Next, the system generates a load profile based on the desired temperature profile, wherein the load profile specifies read/write operations on the disk drive. The system then applies the load profile to the disk drive to generate disk drive activity, wherein the disk drive activity causes the temperature in the disk drive to track the desired temperature profile.

In a variation on this embodiment, the system dynamically controls the temperature within the disk drive using a feedback and control loop, which facilitates obtaining the desired temperature profile in the disk drive.

In a further variation on this embodiment, the system obtains the desired temperature profile using the feedback and control loop by: (1) measuring the temperature profile and read/write performance from the disk drive; (2) computing a difference between the temperature profile and the desired temperature profile; (3) adjusting the load profile based on the difference; and (4) applying the adjusted load profile to the disk drive.

In a variation on this embodiment, the desired temperature profile is cyclical, which facilitates performing an accelerated temperature reliability test on the disk drive.

In a variation on this embodiment, the desired temperature profile can include: (1) a square-wave profile; (2) a sinusoidal profile; (3) a sawtooth profile; and (4) other periodical waveform profiles.

In a variation on this embodiment, the system generates the load profile by specifying frequency and magnitude of the read/write operations based on amplitude and period of the desired temperature profile.

In a variation on this embodiment, the system applies the load profile to the disk drive by: (1) writing/reading the specified data (sequentially or randomly) to/from the disk drive; and (2) verifying that the data read back from the disk drive is the same as the data written onto the disk drive.

In a variation on this embodiment, the system monitors the disk drive to detect a temperature dependent disk drive failure. Next, if a disk drive failure occurs, the system records the precise time when the disk drive failure occurs.

In a further variation on this embodiment, the system measures the temperature profile and read/write performance from the disk drive using a telemetry system.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs), DVDs (digital versatile discs or digital video discs), or any device capable of storing data usable by a computer system.

Overview

The present invention performs in-situ temperate cycling within disk drives without having to ship the disk drives to an outside testing facility. More specifically, the present invention operates by configuring a high-stress read/write load generation mechanism, which is integrated with continuous system telemetry that monitors disk drive's internal temperatures and read/write performance. The load generation mechanism cycles the load periodically to generate disk drive activity which can subsequently cause periodical temperature profiles (e.g., sinusoidal, square-wave functions, saw-tooth profiles) with desired amplitudes in typical disk array configurations in computer systems.

Computer System

Figure 1:
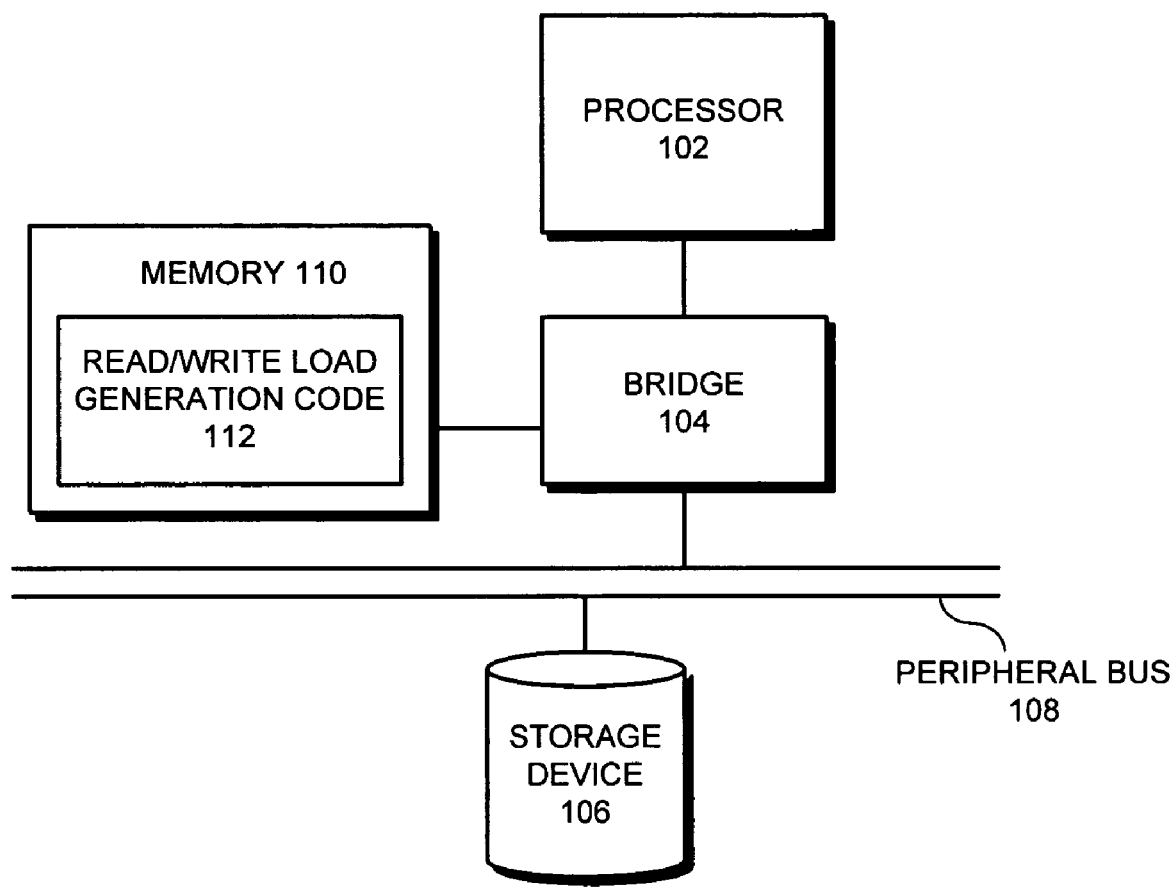
FIG. 1 illustrates a computer system in accordance with an embodiment of the present invention.

FIG. 1 illustrates a computer system 100 in accordance with an embodiment of the present invention. As illustrated in FIG. 1, computer system 100 includes processor 102, which is coupled to a memory 100 and a peripheral bus 108 through bridge 104. Bridge 104 can generally include any type of circuitry for coupling components of computer system 100 together.

Processor 102 can include any type of processor, including, but not limited to, a microprocessor, a mainframe computer, a digital signal processor, a personal organizer, a device controller and a computational engine within an appliance.

Processor 102 communicates with storage device 106 through bridge 104 and peripheral bus 108. Storage device 106 can include any type of rotating non-volatile storage device that can be coupled to a computer system. This includes, but is not limited to, magnetic, optical, and magneto-optical storage devices. In one embodiment of the present invention, storage device 106 comprises a single hard-disk drive (HDD). In another embodiment of the present invention, storage device 106 is a storage array which comprises an array of hard-disk drives (HDDs).

Processor 102 communicates with memory 110 through bridge 104. Memory 110 can include any type of memory that can store code and data for execution by processor 102. As illustrated in FIG. 1, memory 110 contains read/write load generation code 112. Read/write load generation code 112 contains instructions for generating I/O operations in storage device 106, wherein the I/O operations are generated to dynamically control the temperature inside storage device 106. This read/write load generation code is described in more detail below with reference to FIG. 2 and FIG. 3.

Note that although the present invention is described in the context of computer system 100 illustrated in FIG. 1, the present invention can generally operate on any type of computing device that allows dynamically controlling a temperature profile within a storage device. Hence, the present invention is not limited to the computer system 100 illustrated in FIG. 1.

Dynamically Controlling a Temperature Profile within a Disk Drive

Figure 2:
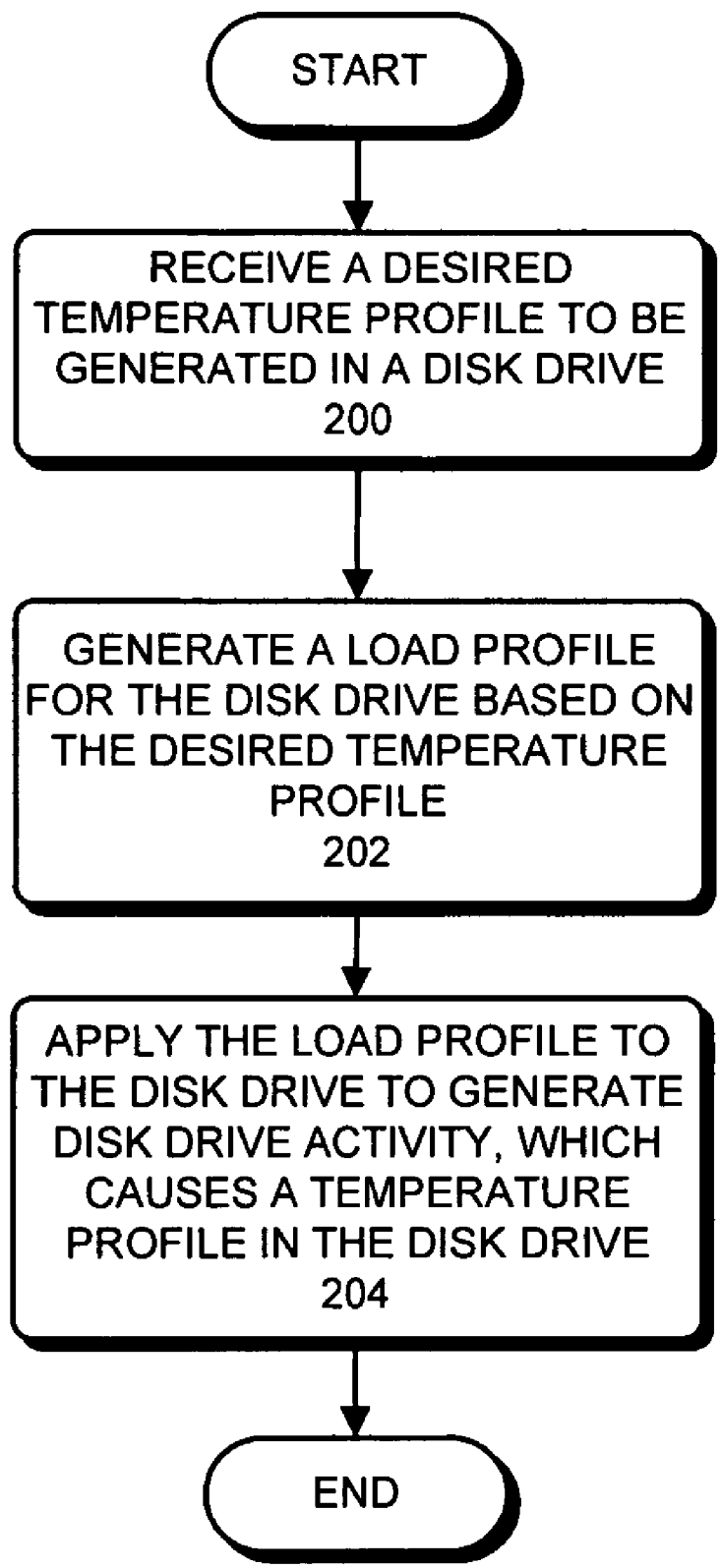
FIG. 2 presents a flowchart illustrating the process of dynamically controlling a temperature profile within a disk drive by generating specific disk drive activity in accordance with an embodiment of the present invention.

FIG. 2 presents a flowchart illustrating the process of dynamically controlling a temperature profile within a disk drive by generating specific disk drive activity in accordance with an embodiment of the present invention.

The system starts by receiving a user-defined desired temperature profile, which is to be generated in the disk drive for a temperature-dependent reliability study (step 200). Note that the desired temperature profile can be a same pattern as a temperature pattern generated by a thermal chamber. In one embodiment of the present invention, the desired temperature profile is cyclical, which simulates ramping the temperature up and down in an accelerated temperature reliability test. Note that the desired temperature profile can include, but is not limited to, a square-wave profile, a sinusoidal profile, a saw-tooth profile, and other periodical waveform profiles.

Next, the system generates a load profile for the disk drive based on the desired temperature profile (step 202). Note that the load profile specifies time-dependent I/O operations to be applied to the disk drive. More specifically, the system specifies frequency and magnitude of the I/O operations based on amplitude and period of the desired temperature profile. In one embodiment, the frequency of the I/O operations specifies how many I/O operations are performed per second, and the magnitude of the I/O operations specifies the size of the data blocks being written to and read back from the disk drive in each I/O operation. Typically, a higher frequency of the I/O operations generates heavier disk drive activity, thereby causing a higher temperature in the disk drive. Note that the load profile can be generated by a computer code/script. In one embodiment of the present invention, the load profile is generated by read/write load generation code 112 in FIG. 1.

The system then applies the load profile to the disk drive to generate disk drive activity, which subsequently induces a temperature profile in the disk drive (step 204). In one embodiment of the present invention, the system first generates random data and then writes the random data to random disk locations. Next, after reading back the random data from the disk, the system performs a check to verify that the data read back from the disk drive is the same as the data written onto the disk drive. Note that it is desirable to use randomly generated data when executing the load profile on the drive, which can prevent the read/write operations to take place through direct caching which bypasses the disk drive.

Figure 3:
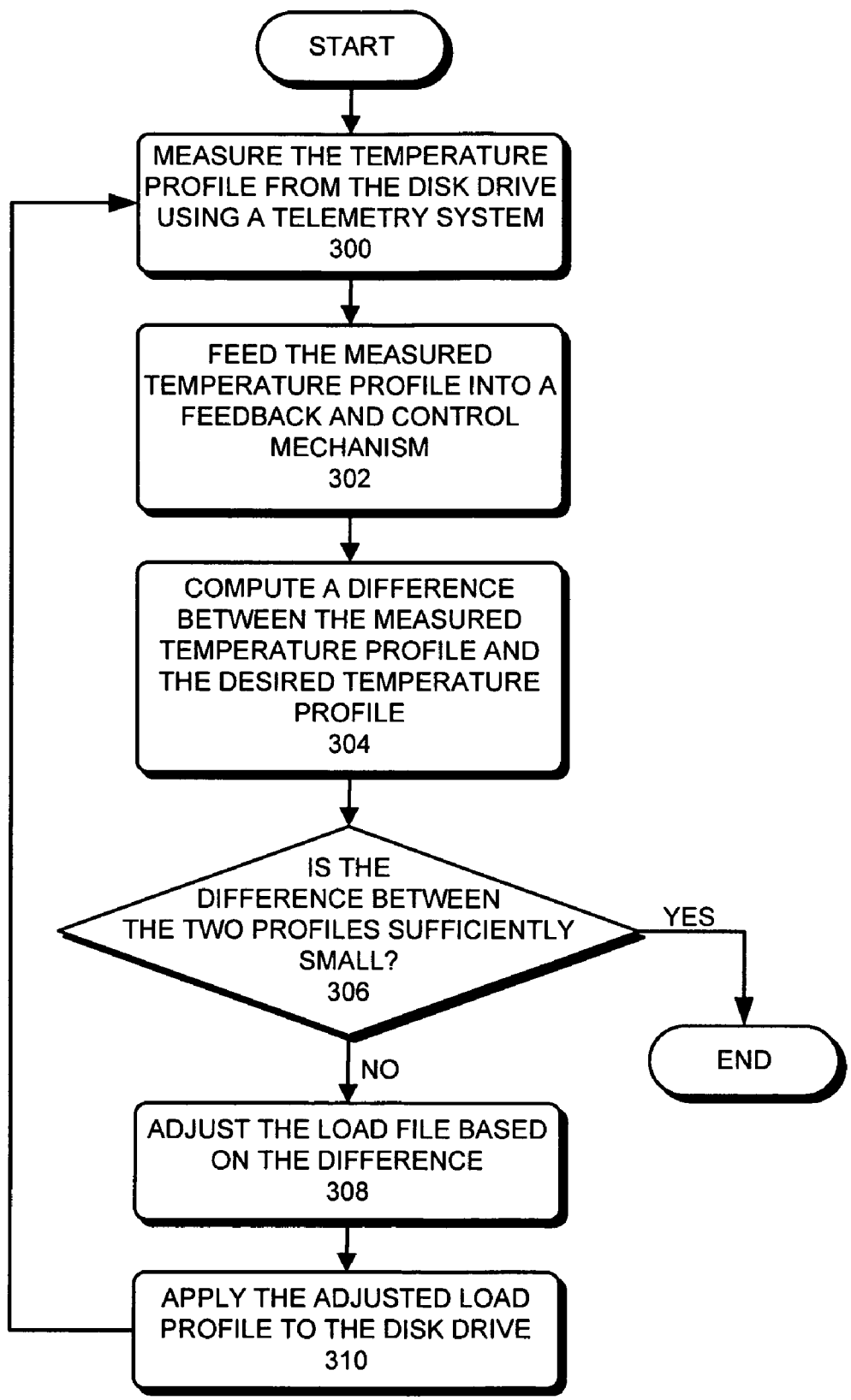
FIG. 3 presents a flowchart illustrating the process of obtaining the desired temperature profile in the disk drive using feedback in accordance with an embodiment of the present invention.

Note that the initial temperature profile generated by the load profile in the disk drive may or may not look like the desired temperature profile. However, a feedback and control mechanism can be used to adjust the temperature profile toward the desired temperature profile. More specifically, FIG. 3 presents a flowchart illustrating the process of obtaining the desired temperature profile in the disk drive using feedback in accordance with an embodiment of the present invention.

During operation, a software-based telemetry system is used to measure the temperature profile from the disk drive (step 300), for example, using embedded temperature sensors inside the drive. The system then feeds the measured temperature profile into a feedback and control mechanism (step 302).

Next, the feedback and control mechanism computes a difference between the measured temperature profile with the desired temperature profile (step 304) and subsequently determines if the two profiles are sufficiently close (step 306). If not so, the system then adjusts the load profile based on the computed difference (step 308). Next, the system applies the adjusted load profile to the disk drive (step 310). The process then returns to step 300 and repeats. Note that feedback and control mechanism allows the generated temperature profile to be sufficiently close to the desired temperature profile after a number of iterations through steps 300-310.

CONCLUSION

The present invention uses an in-situ thermal margining technique to perform temperature-dependent reliability studies on a disk drive. This has several benefits in comparison to a thermal chamber test:

(1) One can monitor disk drive operations in real-time while they are being temperature cycled; whereas for conventional accelerated-life studies, it is logistically difficult to run I/O cables into the thermal chamber to do real-time monitoring in conjunction with reliability tests;

(2) The in-situ thermal margining can be conducted at repair centers, in manufacturing and Ongoing Reliability Testing (ORT) labs, and even at customer sites for stubborn failure mechanisms that resist-root cause analysis confirmation;

(3) Because one can monitor the drives while they are undergoing dynamic temperature margining, it becomes possible to detect an onset of a temperature dependent disk drive failure, and identify the exact times when disk driver failures occur. In comparison, conventional thermal chamber testing only counts failures after fixed testing windows, e.g., 100 hrs or 500 hrs, etc. Being able to obtain the exact times of failures facilitates much more accurate long term reliability projections.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for dynamically controlling a temperature profile within a disk drive by generating disk drive activity, comprising:
   receiving a desired temperature profile;
   generating a load profile based on the desired temperature profile,
   wherein the load profile specifies read/write operations on the disk; and
   wherein generating the load profile involves specifying frequency and magnitude of the read/write operations based on amplitude and period of the desired temperature profile; and
   applying the load profile to the disk drive to generate disk drive activity, wherein the disk activity causes a temperature profile in the disk drive.

2. The method of claim 1, wherein the method is performed in a feedback and control loop to facilitate obtaining the desired temperature profile in the disk drive.

3. The method of claim 2, wherein obtaining the desired temperature profile using the feedback and control loop involves:
   measuring the temperature profile and read/write performance from the disk drive;
   computing a difference between the temperature profile and the desired temperature profile;
   adjusting the load profile based on the difference; and
   applying the adjusted load profile to the disk drive.

4. The method of claim 3, wherein measuring the temperature profile and the read/write performance from the disk drive involves using a telemetry system.

5. The method of claim 1, wherein the desired temperature profile is cyclical, which facilitates performing an accelerated temperature reliability test on the disk drive.

6. The method of claim 1, wherein the desired temperature profile includes one of:
   a square-wave profile;
   a sinusoidal profile;
   a sawtooth profile; and
   a periodical waveform profile.

7. The method of claim 1, wherein applying the load profile to the disk drive involves:
   writing data to the disk drive;
   reading back the written data from the disk drive; and
   verifying that the data which is read back from the disk drive is the same as the data which is written to the disk drive.

8. The method of claim 1, further comprising:
   monitoring the disk drive to detect a temperature-dependent disk drive failure; and
   if a disk drive failure occurs, recording the precise time when the disk drive failure occurs.

9. A computer-readable storage medium storing instructions that when executed by a computer cause the computer to perform a method for dynamically controlling a temperature profile within a disk drive by generating disk drive activity, the method comprising:
   receiving a desired temperature profile;
   generating a load profile based on the desired temperature profile,
   wherein the load profile specifies read/write operations on the disk drive; and
   wherein generating the load profile involves specifying frequency and magnitude of the read/write operations based on amplitude and period of the desired temperature profile; and
   applying the load profile to the disk drive to generate disk drive activity, wherein the disk activity causes a temperature profile in the disk drive.

10. The computer-readable storage medium of claim 9, wherein the method is performed in a feedback and control loop to facilitate obtaining the desired temperature profile in the disk drive.

11. The computer-readable storage medium of claim 10, wherein obtaining the desired temperature profile using the feedback and control loop involves:
- measuring the temperature profile and read/write performance from the disk drive;
- computing a difference between the temperature profile and the desired temperature profile;
- adjusting the load profile based on the difference; and
- applying the adjusted load profile to the disk drive.

12. The computer-readable storage medium of claim 9, wherein the desired temperature profile is cyclical, which facilitates performing an accelerated temperature reliability test on the disk drive.

13. The computer-readable storage medium of claim 9, wherein the desired temperature profile includes one of:
- a square-wave profile;
- a sinusoidal profile;
- a sawtooth profile; and
- a periodical waveform profile.

14. The computer-readable storage medium of claim 9, wherein applying the load profile to the disk drive involves:
- writing data to the disk drive;
- reading back the written data from the disk drive; and
- verifying that the data which is read back from the disk drive is the same as the data which is written to the disk drive.

15. The computer-readable storage medium of claim 9, wherein the method further comprises:
- monitoring the disk drive to detect a temperature-dependent disk drive failure; and
- if a disk drive failure occurs, recording the precise time when the disk drive failure occurs.

16. A computer system that dynamically controls a temperature profile within a disk drive by generating disk drive activity, comprising:
- a CPU;
- a memory;
- a receiving mechanism configured to receive a desired temperature profile;
- a generating mechanism configured to generate a load profile based on the desired temperature profile,
  - wherein the load profile specifies read/write operations on the disk drive; and
  - wherein the generating mechanism is further configured to specify frequency and magnitude of the read/write operations based on amplitude and period of the desired temperature profile; and
- a loading mechanism configured to apply the load profile to the disk drive to generate disk drive activity, wherein the disk activity causes a temperature profile in the disk drive.

17. The computer system of claim 16, further comprising a feedback and control mechanism configured to obtain the desired temperature profile in the disk drive.

18. The computer system of claim 17, wherein the feedback and control mechanism is configured to:
- measure the temperature profile and read/write performance from the disk drive;
- compute a difference between the temperature profile and the desired temperature profile;
- adjust the load profile based on the difference; and to
- apply the adjusted load profile to the disk drive.

19. The computer system of claim 16, further comprising:
- a monitoring mechanism configured to monitor the disk drive to detect a temperature dependent disk drive failure; and
- a recording mechanism configured to record the precise time if a disk drive failure occurs.

* * * * *

UNITED STATES PATENT AND TRADEMARK OFFICE
CERTIFICATE OF CORRECTION

PATENT NO.         : 7,660,060 B2                                          Page 1 of 1
APPLICATION NO.    : 11/471206
DATED              : February 9, 2010
INVENTOR(S)        : Vaidyanathan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 797 days.

Signed and Sealed this

Thirtieth Day of November, 2010

David J. Kappos
*Director of the United States Patent and Trademark Office*